(12) United States Patent
Liu

(10) Patent No.: US 11,490,165 B2
(45) Date of Patent: Nov. 1, 2022

(54) METHOD FOR DISPLAY CONTROL AND DISPLAY DEVICE

(71) Applicant: HKC CORPORATION LIMITED, Shenzhen (CN)

(72) Inventor: Dan Liu, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/290,261

(22) PCT Filed: Dec. 6, 2019

(86) PCT No.: PCT/CN2019/123488
§ 371 (c)(1),
(2) Date: Apr. 30, 2021

(87) PCT Pub. No.: WO2020/134952
PCT Pub. Date: Jul. 2, 2020

(65) Prior Publication Data
US 2021/0385543 A1 Dec. 9, 2021

(30) Foreign Application Priority Data

Dec. 24, 2018 (CN) .......................... 201811579696.2

(51) Int. Cl.
*H04N 21/475* (2011.01)
*H04N 21/442* (2011.01)
(Continued)

(52) U.S. Cl.
CPC ..... *H04N 21/4751* (2013.01); *H04N 21/4436* (2013.01); *H04N 21/44222* (2013.01); *H04N 21/4753* (2013.01); *H04N 21/4854* (2013.01)

(58) Field of Classification Search
CPC ......... H04N 21/4751; H04N 21/44222; H04N 21/4436; H04N 21/4753; H04N 21/4854;
(Continued)

(56) References Cited

U.S. PATENT DOCUMENTS

| 2009/0133051 A1* | 5/2009 | Hildreth ........... H04N 21/42204 725/28 |
| 2011/0007935 A1* | 1/2011 | Reed ..................... G06T 1/0028 382/165 |
| 2017/0180808 A1* | 6/2017 | Kageyama ............ G06F 3/0481 |

FOREIGN PATENT DOCUMENTS

| CN | 101257608 A | 9/2008 |
| CN | 101805569 A | 8/2010 |

(Continued)

OTHER PUBLICATIONS

Wen Zhang, the Internatianal Searching Authority written comments, dated Mar. 2020. CN.
(Continued)

*Primary Examiner* — Kunal Langhnoja

(57) ABSTRACT

The present application discloses a method for display control and a display device, including: detecting program information acquiring information of a currently displayed program; determining a children's program: identifying the children's program based on the program information; and controlling the displaying: if the program is not a children's program, displaying the program normally on a television, and if the program is a children's program, starting a preset protection mechanism.

6 Claims, 3 Drawing Sheets

(51) Int. Cl.
*H04N 21/443* (2011.01)
*H04N 21/485* (2011.01)

(58) Field of Classification Search
CPC ......... H04N 21/4383; H04N 21/44008; H04N 21/454; H04N 21/4882
See application file for complete search history.

(56) References Cited

FOREIGN PATENT DOCUMENTS

| | | |
|---|---|---|
| CN | 201830408 U | 5/2011 |
| CN | 103338404 A | 10/2013 |
| CN | 104936019 A | 9/2015 |
| CN | 108521606 A | 9/2018 |
| CN | 109729422 A | 5/2019 |
| WO | WO-2005017739 A1 * 2/2005 ........... G06F 3/1423 |

OTHER PUBLICATIONS

Wen Zhang, the International Searching Authority written comments, dated Mar. 2020, CN.
Classification of Video Color Style Based on Cumulative Histograms, Wang, Zhen et al. Journal of University of Jinan (Sci and Tech.) Apr. 30, 2011, 186-190.

* cited by examiner

METHOD FOR DISPLAY CONTROL AND DISPLAY DEVICE

CROSS REFERENCE OF RELATED APPLICATIONS

The present application claims priority to the Chinese Patent Application No. CN201811579696.2, filed with the National Intellectual Property Administration, PRC on Dec. 24, 2018 and entitled "METHOD FOR DISPLAY CONTROL AND DISPLAY DEVICE", which is incorporated herein by reference in its entirety.

TECHNICAL FIELD

The present application relates to the field of display technologies, and particularly to a method for display control and a display device.

BACKGROUND

The statements herein merely provide background information related to the present application and do not necessarily constitute the conventional art.

Display panels have many advantages such as thin body, power saving, and absence of radiation, and are widely used. The rationale of display panels is to provide liquid crystal molecules in two parallel glass substrates and apply a driving voltage on the two glass substrates to control the orientation of the liquid crystal molecules, so as to refract the light of backlight modules to generate an image. With the development of display panels, displayed images are brighter and clearer, and a long term of watching may cause visual fatigue.

Currently, children usually spend more time on watching TV. However, lack of self-control and abstinence always poses a long term of watching, which greatly compromises the vision, resulting in an increasing proportion of myopia in children. In addition to the artificial restriction of parents, some televisions may also provide timed turn-off functions. Such functions always lacks flexibility, and the television will also be turned off when an adult is watching. Children will suffer from reduced vision due to long-term watching, while adults may be bothered by tuned turn-off functions.

SUMMARY

The present application provides a method for display control and a display device, which can intelligently protect the vision of children without compromising the watching experience of adults.

For the above purpose, the present application provides a method for display control, including:

detecting program information: acquiring information of a currently displayed program;

determining a children's program: identifying the children's program based on the program information; and controlling the displaying: if the program is not a children's program, displaying the program normally on a television, and if the program is a children's program, starting a preset protection mechanism.

The present application further discloses a method for display control, including:

detecting program information: acquiring information of a currently displayed program;

determining a channel: identifying whether the channel is a children's channel based on channel information, if not, displaying the program normally on a television, and if yes, determining a color saturation;

determining the color saturation: determining whether the color saturation is greater than 80, if not, displaying the program normally on the television, and if yes, determining a displaying time;

determining the displaying time: determining whether the displaying time is greater than the preset time, if not, displaying the program normally on the television, and if yes, starting a protection mechanism; and starting the protection mechanism: popping up a prompt message and a password input box, if a password is input, displaying the program normally on the television, and if not, turning off the television.

The present application further discloses a display device, including: a television;

a detection component configured to acquire information of a currently displayed program;

a determining component configured to determine whether the program is a children's program; and a control component configured to control whether to turn off a television, if the program is not a children's program, displaying the program normally on the television, and if the program is a children's program, starting a protection mechanism.

Compared with the scheme of adding a child lock to the television, the present application acquires the program information of the currently displayed content, and determines whether the currently displayed content is a children's program according to the program information. Whether the program is a children's program is intelligently identified. If the program is a children's program, a corresponding protection mechanism is started to effectively limit children from watching the television and to protect their vision. On the contrast, the watching experience of adults is not influenced.

BRIEF DESCRIPTION OF DRAWINGS

The accompanying drawings, which are included to provide a further understanding of embodiments of the present application and constitute a part of the specification, illustrate embodiments of the application and, together with the text description, explain the principles of the application. Obviously, the drawings in the following description are merely some embodiments of the present application, and those skilled in the art can obtain other drawings according to the drawings without any inventive labor. In the drawings.

DETAILED DESCRIPTION OF EMBODIMENTS

It should be understood that the terminology, specific structural and functional details disclosed are merely exemplary for the purpose of describing specific embodiments. However, the present application may be embodied in many alternative forms and should not be construed as being limited to the embodiments set forth herein.

In the description of the present application, the terms "first" and "second" are only for the purpose of description and cannot be construed to indicate relative importance or imply an indication of the number of technical features indicated. Therefore, unless otherwise stated, a feature defined as "first" and "second" may explicitly or implicitly include one or more of the features; "multiple" means two or more. The term "include" and any variations thereof are intended to be inclusive in a non-closed manner, that is, the presence or addition of one or more other features, integers, steps, operations, units, components and/or combinations thereof may be possible.

In addition, the terms "center", "transverse", "up", "down", "left", "right". "vertical", "horizontal", "top", "bottom", "inner", "outer" and the like for indicating an orientation or positional relationship are based on the description of the orientation or relative positional relationship shown in the accompanying drawings, and are only simplified description facilitating description of the application, and are not intended to indicate that the device or element referred to must have a particular orientation, be configured and operated in a particular orientation, and therefore cannot be construed as limiting the present application.

In addition, unless expressly specified and defined otherwise, the terms "mount", "attach" and "connect" are to be understood broadly, for example, it can be a fixed connection, a detachable connection, or an integral connection; it can be an either mechanical connection or an electrical connection; it can be a direct connection or an indirect connection through an intermediate medium, or an internal connection between two elements. For those skilled in the art, the specific meaning of the above terms in this application can be understood according to the specific circumstances.

Figure 1:
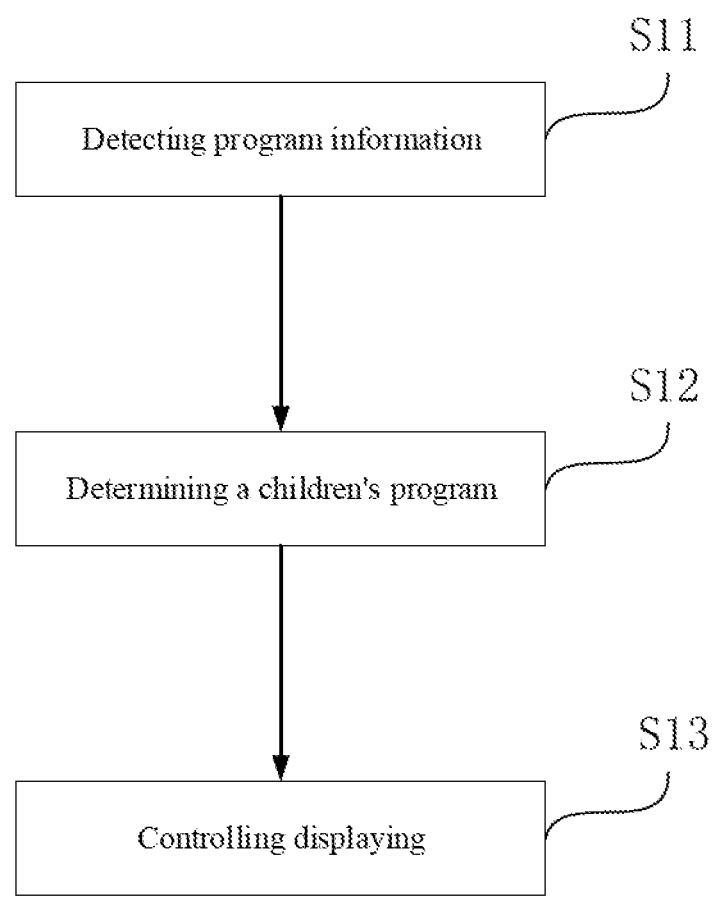
FIG. 1 is a schematic diagram of a method for display control according to one embodiment of the present application.

As shown in FIG. 1, one embodiment of the present application discloses a method for display control, including:

S11, detecting program information acquiring information of a currently displayed program;

S12, determining a children's program: identifying the children's program based on the program information; and S13, controlling the displaying: if the program is not a children's program, displaying the program normally on a television, and if the program is a children's program, starting a preset protection mechanism.

The present application acquires the program information of the currently displayed content, and determines whether the currently displayed content is a children's program according to the program information. Whether the program is a children's program is intelligently identified. If the program is a children's program, a corresponding protection mechanism is started to effectively limit children from watching the television and to protect their vision. On the contrast, the watching experience of adults is not influenced.

In one or more embodiments, the program information includes channel information, and determining a children's program includes:

identifying the children's program based on the channel information.

Different channels may have different channel information. Whether the channel is a children's channel is identified by the channel information. If the channel is a children's channel, it is probable that a children's program is being displayed. Such programs may be preferentially screened for a rapid exclusion. If the channel is not a children's channel, the continuous watching is not influenced.

Further, identifying the children's program based on the channel information includes:

presetting a channel information for the children's program;

comparing the preset channel information with the channel information for the current program; and if the preset channel information is consistent with the channel information of the current program, identifying the program as the children's program.

The channel information of the children's programs, such as the children's channel of the CCTV and the children's channels of local satellite TVs can be preset and stored in advance. When the channel information of the current channel detected is consistent with the preset channel information, the current channel is identified as a children's program, and a further protection measure is taken.

The channel information includes channel frequency information. When the preset channel is compared with the current channel, the frequency information of the channels is preferentially compared. The channel frequency of the preset channel is compared with the channel frequency of the current channel. If the channel frequencies are the same, determining that the preset channel information is consistent with the channel information of the current program, and if the channel frequencies are different, determining that the preset channel information is inconsistent with the channel information of the current program. The frequency bandwidths used by different channels are different. For example, the program frequency of CCTV-1 is 207 MHz~215 MHz, and the frequency of the children's channel is 231 MHz~239 MHz. Whether the channel is a children's channel is determined according to the channel information, and whether the children's channel and other channels are watched is directly determined. The children's channel displays more children's programs, and can be more quickly determined based on the channel information.

The program information further includes color saturation information, and identifying the children's program based on the program information includes: identifying the children's program based on the channel information and the color saturation information. Programs vary in color saturation. Children's programs such as animations are usually bright-colored and have higher color saturations. By identifying the color saturation of a current program, the program is identified as a children's program when the color saturation meets certain criteria, such that the determination is more accurate.

Further, the determination may be performed by combining, both. The program information includes both channel information and color saturation information; and identifying the children's program based on the program information includes:

identifying the children's program based on the channel information and the color saturation information.

Whether the channel is a children's channel is determined according to the channel information, and whether the children's channel or other channels are watched is directly determined. The color saturation of the children's program is relatively higher, and the children's program can be identified by determining the color saturation. When the two are combined, the accuracy for determining the current displaying content is improved.

The specific steps of identifying the children's program based on the channel information and the color saturation information include:

determining whether the channel is a children's channel according to the channel information, if yes, reading the color saturation information, and when the color saturation information exceeds a preset value, identifying the program as the children's program.

When the channel is determined as the children's channel according to the channel information, the color saturation information is read. If the color saturation information exceeds the preset value, the program is determined as the children's program. By determining the channel information and the color saturation, the accuracy for determination is improved, and the possibility of misjudgment may be reduced.

For the color saturation and settings, a certain range of color saturation may be acquired by big data algorithm of a computer comparing a sufficient quantity of children's programs. A television program falling in the range may have a higher probability being a children's program. The preset value of color saturation is in a range of 70 to 100. The saturation for a black screen is set to 0, and the saturation for a full-brightness color (including red, green, blue, yellow, etc.) is set to 100. The color saturation of the children's program is usually higher, and when the color saturation reaches 70, the program has a high probability being a children's program. Specifically, the preset value of color saturation is 80; when the color saturation information exceeds 80, the program is identified as a children's program.

In one or more embodiments, the protection mechanism includes: turning off the television.

For protecting the eyesight of children, the duration of watching television programs by children is generally reduced, and the most direct method of the protection mechanism is to turn off the television, such that the eyesight of children can be protected to the maximum extent.

Or after the program is identified as the children's program, prompt information is popped up to determining whether the program is watched by an adult according to the information. If the program is watched by adults, continuing displaying the program normally; if no determining information or reaction is returned, the program can be determined watched by a child, and the television is turned off at the moment. Since the younger children do not have the ability to identify the prompt information, the prompt information cannot be fed back. Therefore, the watching experience of adults is not influenced, and the determination is preformed according to different crowds, such that the determination mechanism is more reasonable.

Certainly, the current channel may also be switched. The method includes the following specific steps:

automatically switching the children's program by switching the current channel to a channel of a non-children's program.

When a children's program is detected, the channel can be automatically switched to a channel without children's program, such as an education channel, a science and education channel and the like. After children watch the switched channel, the attention is reduced, and the interest in continuously watching is greatly reduced, such that the watching time of the children is shortened, and the interest of the children in scientific exploration may be favorably developed.

In one or more embodiments, starting a preset protection mechanism includes:

setting a preset time and recording a displaying time, and if the displaying time is longer than the preset time, automatically switching a current picture to a preset blue screen.

The vision of children can be relatively protected by setting a preset time, such that reasonable distribution is achieved. Only when the displaying time exceeds the preset time, the screen is switched to a preset blue screen, with sound only but no picture. The overtime displaying for children is prompted, and the affect due to long-term watching may be avoided. Specifically, the preset time can be set to 0.5 hours. Generally, for example, when the duration of an episode of an animation does not exceed 0.5 hours, the watching requirement for children can be met. Meanwhile, 0.5-hours watching may not bring visual fatigue. Different preset durations can be set for children in different age stages for a more reasonable and effective schedule.

In one or more embodiments, a protection mechanism includes: setting a preset time and recording a displaying time, and if the displaying time is longer than the preset time, popping up a prompt message and a password input box for inputting a password for watching, and otherwise, turning off the television.

Such procedures included in the protection mechanism protect children from watching television without compromising the watching experience of adults. Adults may also watch the children's program. The adults can continue to watch the program after inputting the password without limiting the watching of the adults.

Figure 2:
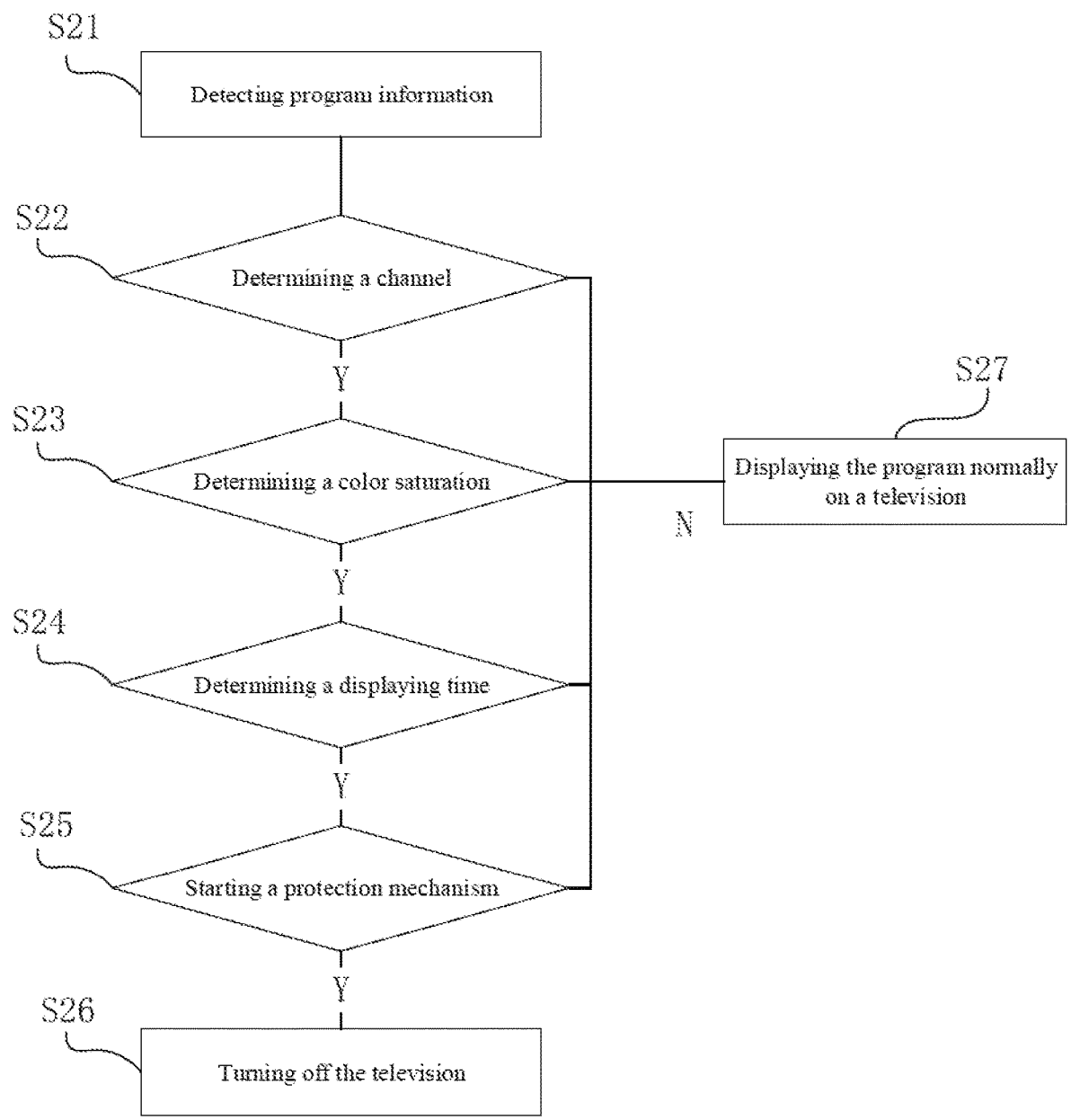
FIG. 2 is a schematic diagram of another method for display control according to one embodiment of the present application.

As shown in FIG. 2, one embodiment of the present application discloses a method for display control, including:

S21, detecting program information: acquiring information of a currently displayed program;

S22, determining a channel: identifying whether the channel is a children's channel based on channel information, if not, executing S27, and if yes, determining a color saturation;

S23, determining a color saturation: determining whether the color saturation is greater than 80, if not, executing S27, and if yes, determining a displaying time;

S24, determining a displaying time: determining whether the displaying time is greater than the preset time, if not, executing S27, and if yes, starting a protection mechanism;

S25, starting a protection mechanism: popping up a prompt message and a password input box, if a password is input, executing S27, and if not, executing S26;

S26, turning off the television; and

S27, displaying the program normally on a television.

The prompt information of the present application includes a warm prompt and an unlocking prompt. The present application acquires the program information of the currently displayed content, and determines the currently displayed content according to the program information. The frequency bandwidths used by different channels are different. For example, the program frequency of CCTV-1 is 207 MHz~215 MHz, and the frequency of the children's channel is 231 MHz~239 MHz. Whether the channel is a children's channel is determined according to the channel information, and whether the children's channel and other channels are watched is directly determined. When the channel is determined as the children's channel according to the channel information, the color saturation information is read. If the color saturation information exceeds the preset value, the program is determined as the children's program. By determining the channel information and the color saturation, the accuracy for determination is improved, and the possibility of misjudgment may be reduced. For protecting the eyesight of children, the duration of watching television programs by children is generally reduced, and if the displaying time is longer than the preset time, prompt information and a password input box are popped up. Such procedures protect children from watching television without compromising the watching experience of adults. Adults may also watch the children's program. The adults can continue to watch the program after inputting the password without limiting the watching of the adults.

Figure 3:
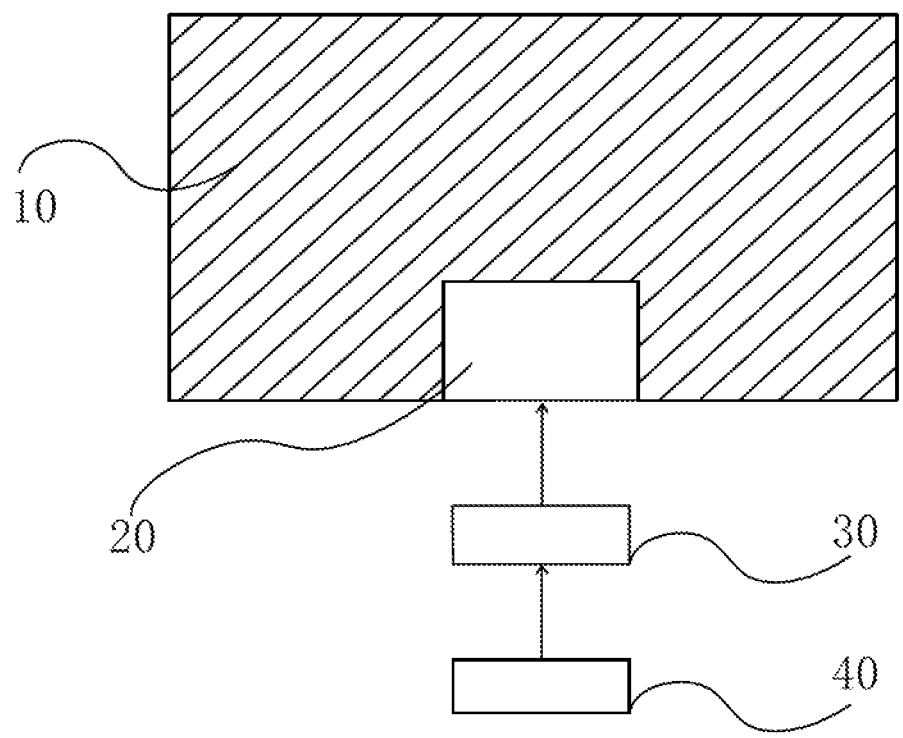
FIG. 3 is a schematic diagram of a device for intelligently protecting children's vision according, to one embodiment of the present application.

As shown in FIG. 3, one embodiment of the present application discloses a display device, including: a television 10;

a detection component 40 configured to acquire information of a currently displayed program;

a determining component 30 configured to determine whether the program is a children's program; and a control component 20 configured to control whether to turn off a television, if the program is not a children's program, displaying the program normally on the television, and if the program is a children's program, starting a protection mechanism.

The main functions of the device are implemented by the three components, and the displayed content can be analyzed and determined by the three components and can be controlled accordingly. In the display device, an external network usually serves as the detection component to acquire current program information, a set-top box serves as the determining component to determine program information, and finally a mainboard serves as the control component to control Whether the television is turned off. As such, corresponding steps are taken. This device limits the watching of children to the maximum extent to protect the eyesight of children, without significantly compromising the watching experience of adults.

It should be noted that, the limitation of the steps involved in this solution, without affecting the implementation of the specific solution, is not determined to limit the sequence of steps, and the previous steps may be executed first, later, or even simultaneously, and shall be deemed to fall within the scope of the present application as long as the solution can be implemented.

The technical scheme of the present application applies to display devices using various display panels, such as Twisted Nematic (TN) display panels, In-Plane Switching (IPS) display panels, Vertical Alignment (VA) display panels and Multi-Domain Vertical Alignment (MVA) display panels, and other types of display panels, such as Organic Light-Emitting Diode (OLED) display panels.

The above content is a further detailed description of the present application in conjunction with specific, optional embodiments, and it is not to be construed that specific embodiments of the present application are limited to these descriptions. For those of ordinary skill in the art to which this application belongs, a number of simple derivations or substitutions may be made without departing from the spirit of this application, all of Which shall be deemed to fall within the scope of this application.

What is claimed is:

1. A method for display control, comprising:
acquiring information of a currently displayed program;
identifying whether the currently displayed program is a children's program based on the acquired program information, the acquired program information comprising channel information and color saturation information; wherein identifying whether the currently displayed program is a children's program based on the acquired program information comprises: determining whether a currently displayed channel is a children's channel according to the channel information, in response to determining that the currently displayed channel is a children's channel, reading the color saturation information, determining whether a color saturation is greater than 80, and in response to the color saturation information exceeding 80, identifying that the currently displayed program is a children's program, otherwise in response to the color saturation information not exceeding 80, identifying that the currently displayed program is not a children's program; and
in response to identifying that the currently displayed program is not a children's program, continuing displaying the currently displayed program normally on a television, and otherwise in response to identifying that the currently displayed program is a children's program, starting a preset protection mechanism by: setting a preset time and recording a displaying time, and in response to the displaying time exceeding the preset time, popping up a prompt message and a password input box for inputting a password for watching, and in response to no password being input, turning off the television;
wherein a user watching the currently displayed program is a child or an adult.

2. The method for display control according to claim 1, wherein determining whether the currently displayed channel is a children's channel according to the channel information comprises:
presetting a channel information for the children's program;
comparing the preset channel information against channel information of the currently displayed program; and
in response to determining that the preset channel information is consistent with the channel information of the currently displayed program, identifying the currently displayed channel as the children's channel.

3. The method for display control according to claim 2, wherein the channel information comprises channel frequency information, and comparing the preset channel information against the channel information of the currently displayed program comprises:
comparing the channel frequency of the preset channel with a channel frequency of the currently displayed channel; and
in response to determining that their channel frequencies are the same, determining that the preset channel information is consistent with the channel information of the currently displayed program, and in response to determining that their channel frequencies are different, determining that the preset channel information is inconsistent with the channel information of the currently displayed program.

4. The method for display control according to claim 1, wherein the preset time is 0.5 hours.

5. A method for display control, comprising:
acquiring information of a currently displayed program;
identifying whether a current channel is a children's channel based on channel information, and in response to determining that the current channel is not a children's channel, continuing displaying the currently displayed program normally on a television;
otherwise in response to determining that the current channel is a children's channel, determining whether a color saturation is greater than 80, and in response to determining that the color saturation is not greater than 80, continuing displaying the currently displayed program normally on the television;
otherwise in response to determining that the color saturation is greater than 80, determining whether a displaying time exceeds a preset time, and in response to determining that the displaying time has not yet exceeded the preset time, continuing displaying the currently displayed program normally on the television; and otherwise in response to determining that the displaying time has exceeded the preset time, starting a protection mechanism: popping up a prompt message and a password input box, and in response to a password being input, continuing to display the program normally on the television, otherwise in response to no password being input, turning off the television;

wherein a user watching the currently displayed program is a child or an adult.

6. A display device, comprising: a television, at least one processor, and a non-transitory computer-readable storage medium storing one or more instructions that, when executed by the at least one processor, cause the following operations to be performed:

acquiring information of a currently displayed program;

identifying whether the currently displayed program is a children's program, the acquired program information comprising channel information and color saturation information; wherein identifying whether the currently displayed program is a children's program based on the acquired program information comprises: determining whether a currently displayed channel is a children's channel according to the channel information, in response to determining that the currently displayed channel is a children's channel, reading the color saturation information, determining whether a color saturation is greater than 80, and in response to the color saturation information exceeding 80, identifying that the currently displayed program is a children's program, otherwise in response to the color saturation information not exceeding 80, identifying that the currently displayed program is not a children's program; and in response to determining that the currently displayed program is not a children's program, continuing displaying the currently displayed program normally on the television, and otherwise in response to determining that the currently displayed program is a children's program, starting a protection mechanism by: setting a preset time and recording a displaying time, and in response to the displaying time exceeding the preset time, popping up a prompt message and a password input box for inputting a password for watching, and in response to no password being input, turning off the television;

wherein a user watching the currently displayed program is a child or an adult.

* * * * *